United States Patent
Opper et al.

(10) Patent No.: US 6,681,976 B2
(45) Date of Patent: Jan. 27, 2004

(54) ROTARY DEVICE FOR A RIVET SETTING MACHINE

(75) Inventors: Reinhold Opper, Alten-Buseck (DE); Joachim Moeser, Gruenberg (DE); Rubén Romero Guitierrez, Wetzler (DE)

(73) Assignee: Newfrey LLC, Newark, DE (US)

( * ) Notice: Subject to any disclaimer, the term of this patent is extended or adjusted under 35 U.S.C. 154(b) by 50 days.

(21) Appl. No.: 10/039,964

(22) Filed: Jan. 4, 2002

(65) Prior Publication Data

US 2002/0092158 A1 Jul. 18, 2002

(30) Foreign Application Priority Data

Jan. 12, 2001 (DE) .................. 201 00 628 U
Apr. 30, 2001 (DE) .................. 201 07 430 U

(51) Int. Cl.⁷ .................................. B27F 7/00
(52) U.S. Cl. ............... 227/137; 227/15; 227/119; 227/135; 29/798
(58) Field of Search ............. 227/43, 112, 51, 227/15, 135, 137, 119; 29/798

(56) References Cited

U.S. PATENT DOCUMENTS

| 4,014,467 | A | * | 3/1977 | Ferguson ............ 239/261 |
| 4,574,473 | A | * | 3/1986 | Sawdon ................ 29/798 |
| 4,938,622 | A | * | 7/1990 | Stoerzbach ............ 403/2 |
| 5,593,239 | A | * | 1/1997 | Sallee ............... 403/109.3 |
| 5,813,114 | A | * | 9/1998 | Blacket et al. ........ 29/809 |
| 5,964,393 | A | * | 10/1999 | Feldpausch et al. .... 227/135 |
| 6,007,268 | A | * | 12/1999 | Whittington et al. ... 403/328 |
| 6,276,050 | B1 | * | 8/2001 | Mauer et al. .......... 29/716 |

FOREIGN PATENT DOCUMENTS

| EP | 0178117 | 4/1986 |
| EP | 0338563 | 4/1989 |
| WO | 9640470 | 12/1996 |

OTHER PUBLICATIONS

EP 0922538 A2, Opper et al., Conveyor for elongate components designed with a head and shank, Jun. 16, 1999.*

* cited by examiner

*Primary Examiner*—Rinaldi I. Rada
*Assistant Examiner*—Thanh Truong
(74) *Attorney, Agent, or Firm*—Miles & Stockbridge P.C.

(57) ABSTRACT

A rotary device for a rivet setting machine for self-punching rivets that includes a rotatable pick-up device (1) having an angle of rotation lock (2), wherein the angle of rotation lock (2) in the open state allows free rotation of the pick-up device (1) relative to a headpiece (12) and in the closed state stops the pick-up device (1) at predeterminable angle positions. An important feature of the present invention is that the pick-up device (1) in the open position permits free rotation, while in the closed position, stops its rotation relative to a headpiece (12) and this can be accomplished in a simple manner, manually and without the use of a separate or special tool.

7 Claims, 4 Drawing Sheets

FIG. I

ROTARY DEVICE FOR A RIVET SETTING MACHINE

BACKGROUND OF THE INVENTION

The invention relates to a rotary device for a rivet setting machine for self-punching rivets having a rotatable pick up device.

A pick up device for a setting machine has the function of picking up rivets in order to set them on a workpiece and fasten them there. With the aid of a C-bracket, which substantially has the shape of a large C and surrounds the workpiece, forces which act on the workpiece via a rivet during the setting process are absorbed on the opposite side of the workpiece. A feed tube is connected to the pick-up device and supplies the pick-up device with rivets.

It is known in the prior art to provide setting machines with a rotatable C-bracket in order to avoid a collision of the space-filling C-bracket with the workpiece. An orientating pin was provided on the C-bracket for stopping the pick-up device of the rotary device. Such an orientation of a pick-up device which used orientation pins was possible only with the use of a separate or special tool. In order to achieve free rotation of the pick-up device of the setting machine the prior art required that the orientation pin first be pulled out, then the pick-up device had to be rotated and, lastly, the orientation pin had to be inserted again. The problem with this was that changing the position of the pick-up device was time-intensive and manual intervention was often necessary, in particular when there was a danger of the supply line, such as for example the feed tube, touching the workpiece.

SUMMARY OF THE PRESENT INVENTION

It is an object of the present invention to provide a rotary device for a rivet setting machine, in which a C-bracket and a pick-up device are rotatable relative to one another and can easily be stopped at different angle settings.

It is another object of the present invention to provide a rotary device for a rivet setting machine that is simple to make and to operate, that is economical to produce and is highly reliable in operation.

It is still another object of the present invention to provide a rotary device for a rivet setting machine that requires no separate or special tools.

The rotary device according to the invention for a rivet setting machine for self-punching rivets having a rotatable pick-up device with an angle of rotation lock, wherein the angle of rotation lock in the open state allows free rotation of the pick-up device relative to a C-bracket headpiece that is also rotatably mounted on the rivet setting machine, while in the closed state, stops the pick-up device at any predeterminable angular position with respect to the C-bracket headpiece. With the aid of the rotatable pick-up device the feed tube is appropriately turned away from a workpiece, so a collision of the feed tube with the workpiece is avoided. By means of the predeterminable angle settings the pick-up device can be stopped at any desired angle settings. With the aid of the angle of rotation lock stopping can be carried out in a simple manner and released to operate again without parts having to be pulled out or dismantled, so free rotation without complications and simple stopping is allowed.

In a further development of the invention the rotary lock has latching means, by which the pick-up device is stopped at any predeterminable angular setting. With the aid of the latching means certain angles of rotation can be predetermined, so simple setting of the angle of rotation of the pick-up device is possible and undesired distortion of the pick-up device is prevented.

In an advantageous further development at least one ball and at least one cavity are present as latching means, wherein by means of a guide non-rotatably connected dot the C-bracket headpiece the ball is movable only in a plane containing the axis of rotation of the rotary lock. Also, the cavity for the ball is located on a pick-up device holder non-rotatably connected to the pick-up device, so in the stopped state of the pick-up device the ball extends at least partially into the cavity, thus preventing rotation of the pick-up device relative to the C-bracket headpiece. Thus, the ball is movable by means of a guide in a plane containing the axis of rotation of the rotary lock, and in the stopped state of the pick-up device at least partially extends into the cavity, in the stopped state rotation of the pick-up device holder relative to the guide or the pick-up device relative to the headpiece is prevented. For example, the movement of the ball along the guide can take place directed radially outwards, away from the axis of rotation, or in the direction parallel to the axis of rotation of the pick-up device, or in combination of the two directions. Rotation of the pick-up device is in any case only possible if the ball does not extend into the cavity.

According to a special further development of the invention at least 8, in particular at least 15, preferably 24 cavities are present as latching means. The number of predeterminable angle positions is established by the number of cavities. For example with 24 cavities arranged so as to be equidistant the angle difference of two successive rotary positions of the angles of rotation is 15 degrees. In a further special development of the invention at least two, in particular four balls are present as latching means. The stability and rotational symmetry of the rotary stopping is increased by using a plurality of balls.

In a particular configuration of the invention the angle of rotation lock has at least one bolt by which the latching means are bolted. With the bolt a higher reliability of stopping with respect to an undesired movement of the pick-up device is achieved. In a special further development of the invention the bolt includes a guide in which the at least one ball is movable only in a plane containing the axis of rotation of the rotary lock.

In a further particular configuration of the invention the bolt is part of a ring surrounding the latching means. An annular structure is advantageous for the bolt in particular with configurations where the balls are movable radially inwards or outwards, as it has a particularly high stability with respect to twisting.

In a further advantageous configuration of the invention the ring can be moved in the direction parallel to the axis of rotation of the angle of rotation lock along grooves in the headpiece. The pick-up device holder is fastened to the headpiece by a groove nut.

In a further development of the rotary device according to the invention the bolt is held with the aid of at least one spring in a position in which the latching means are bolted. This prevents undesired rotation of the pick-up device.

Another feature of the present invention is that the angle of rotation lock can be opened and closed manually without the use of separate or special tools. This is particularly important if the rotary device is manually actuated and/or deactuated.

In a further configuration of the invention the angle of rotation lock can be automatically actuated (not shown), for example magnetically, pneumatically or hydraulically. A higher degree of automation is herewith achieved.

BRIEF DESCRIPTION OF THE ACCOMPANYING DRAWINGS

Further advantages and special configurations of the invention will be described using the following drawings, in which.

DETAILED DESCRIPTION OF THE PREFERRED EMBODIMENTS

Figure 1:
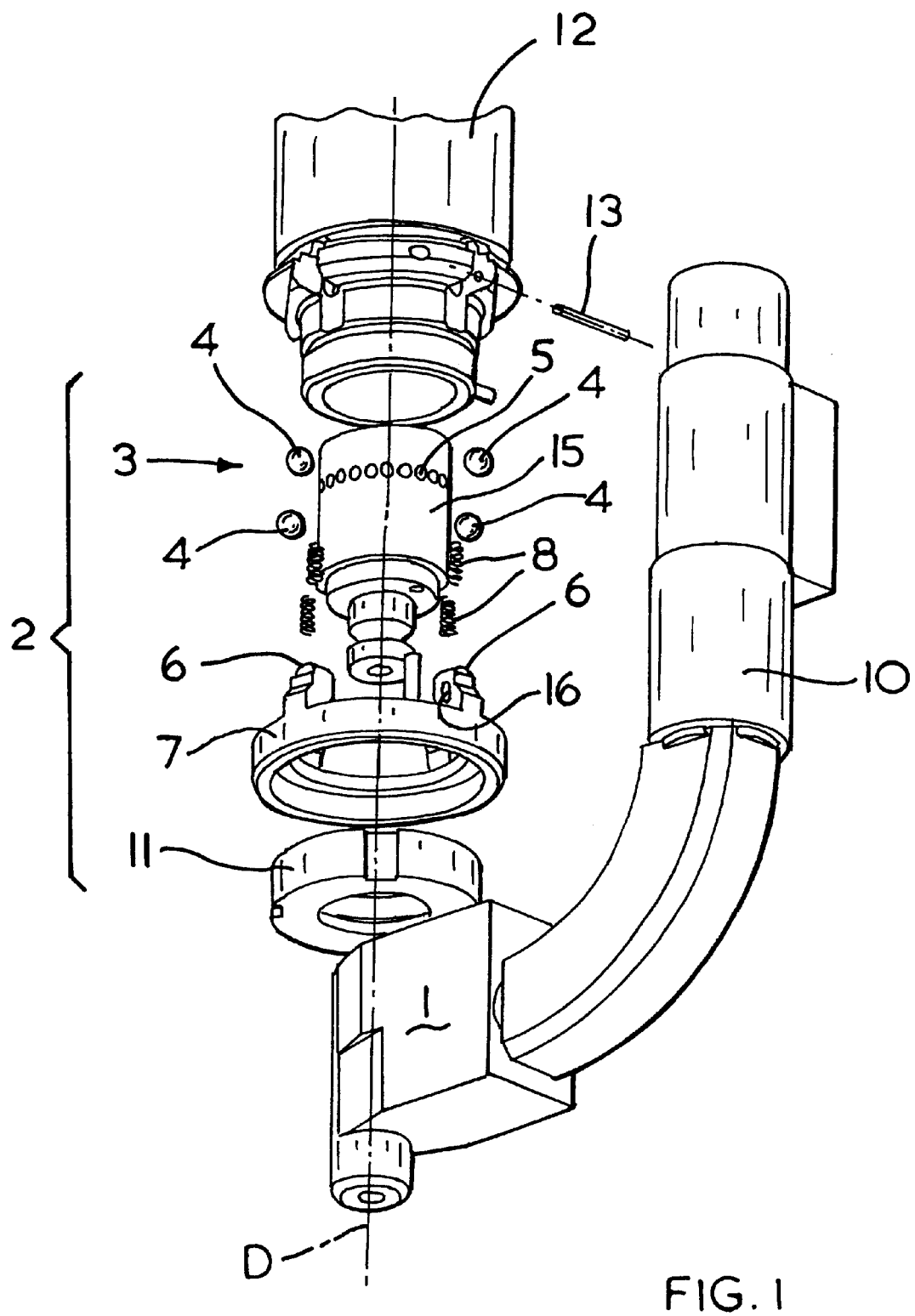
FIG. 1 is an exploded perspective view of a rotary device according to the present invention, illustrating the individual components thereof.
Figure 4:
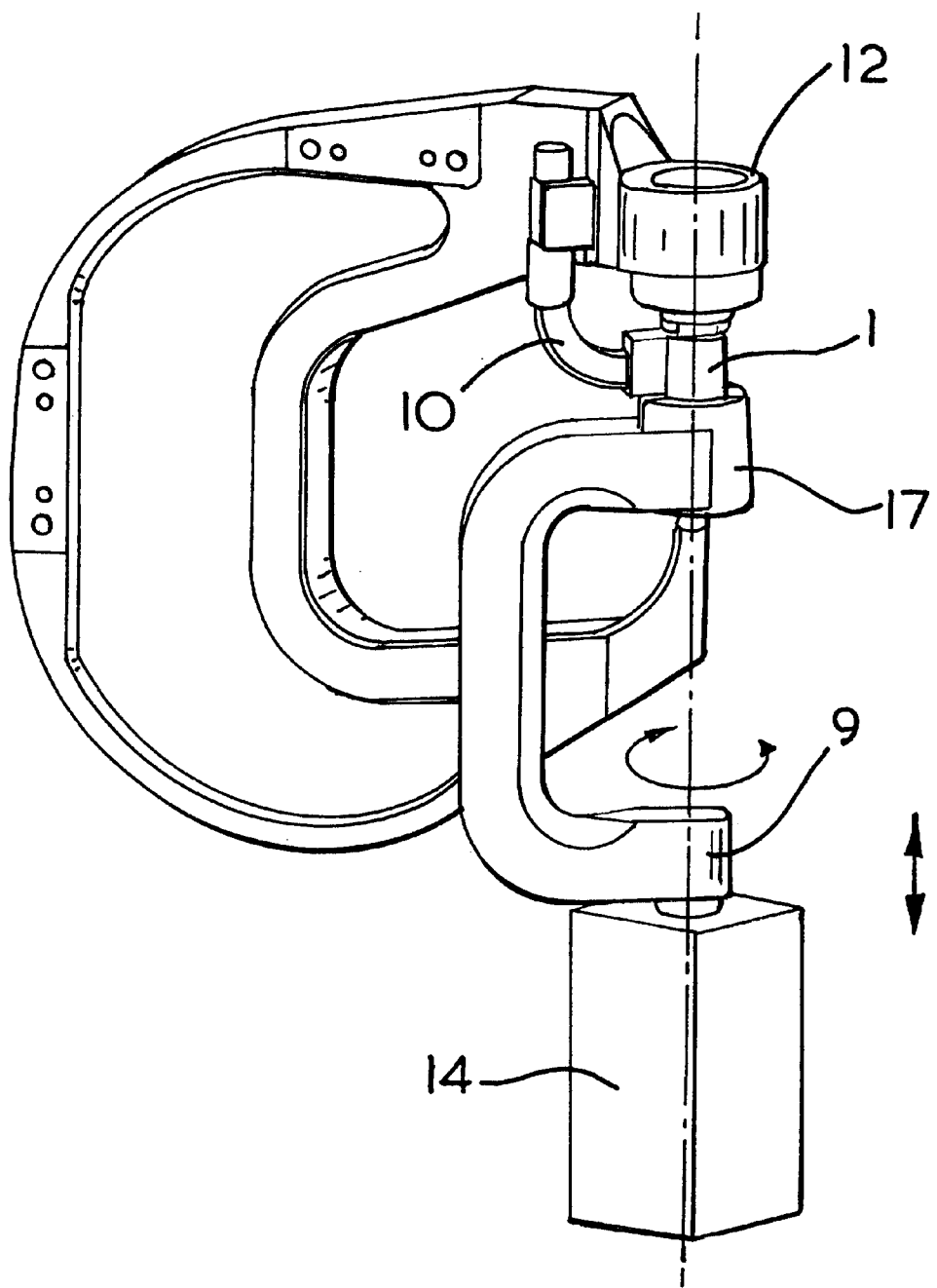
FIG. 4 is a perspective view of a setting machine in which the rotary device of the present invention is embodied.

FIG. 1 shows a rotary device according to the present invention for a rivet Betting machine of the type shown in FIG. 4 having a rotatable pick-up device holder 15, an angle of rotation lock 2 and a headpiece 12, to which the rotatable pick-up device 1 is fastened. The angle of rotation lock 2 contains four balls 4, which, with the aid of four corresponding bolts 6 attached to a ring 7, are pressed by four springs 8 into cavities 5 in a pick-up device holder 15. The ring 7 can be moved along the grooves in the headpiece 12 and prevents rotation of the pick-up device holder 15 when the balls 4 are pressed into their respective cavities 5. The bolts 6 together with the balls 4 and the cavities 5 form latching means, by means of which the pick-up device holder 15 can be stopped at a predeterminable angle position in the headpiece 12. The cavities 5 are worked into the pick-up device holder 15, which is connected to the headpiece 12 with the aid of a groove nut 11. A feed tube 10 supplies the pick-up device 1 with rivets. By movement of the ring 7 the bolts 6 are pushed forward and back, so the balls 4 are pressed along their guides 16 into the cavities 5 or let out of the cavities 5. The guides 16 allow movement of the balls only in a plane substantially containing the axis of rotation D.

Figure 2:
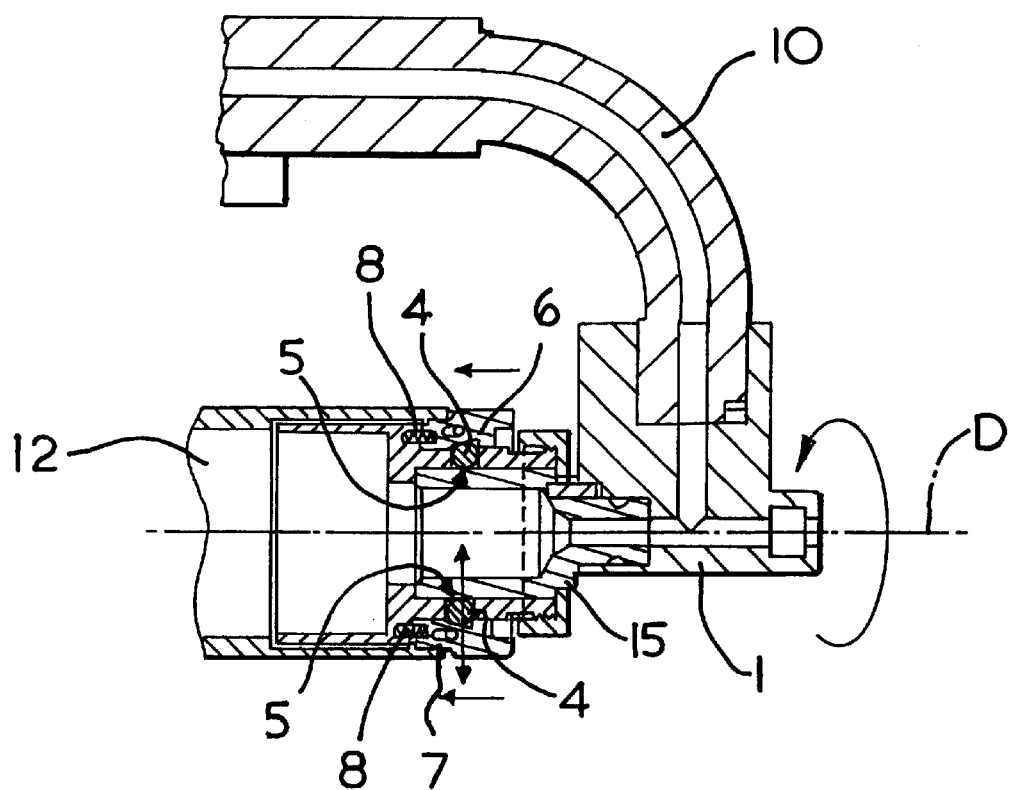
FIG. 2 is a sectional elevational view of the present invention illustrating the device in the open position.

FIG. 2 shows the rotary device according to the invention in the open state. The balls 4 are released from the bolts 6 attached to the ring 7, in that the ring 7 is moved in the direction of the arrow, so the balls 4 can leave their cavities 5. This allows rotation of the pick-up device 1 about its axis of rotation D. Movement of the ring 7 to open the angle of rotation lock 2 is possible only against the spring force of the springs 8.

Figure 3:
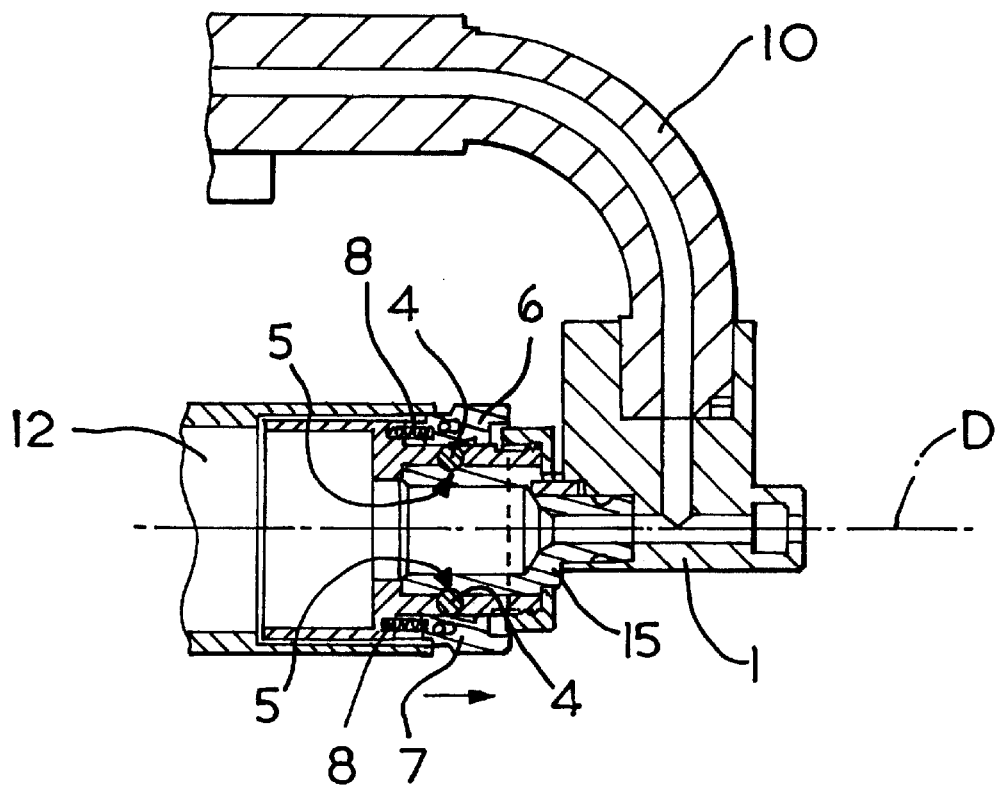
FIG. 3 is a sectional elevational view of the rotary device shown in FIG. 2 illustrating the device in the closed position.

FIG. 3 shows the rotary device according to the invention according to FIG. 2 in the closed state. The springs 8 have pressed the ring 7 in the direction of the arrow and thus effected bolting of the balls 4 in their cavities 5 by the bolts 6. As the guides 16 allow movement of the balls only in a plane containing the axis of rotation, rotation of the pick-up device 1 about its axis of rotation is prevented. With the aid of the ring 7 manual, simple release of the angle of rotation lock is possible without enlisting the aid of further tools.

FIG. 4 shows a setting machine in which the angle of rotation of the pickup device 1 is set with the aid of a tool 9 driven by a drive 14 and, optionally, bolted. The tool 9 is rotatable along the arrow directions indicated and movable in the axial direction. With the aid of the drive 14 an axial stroke is effected between pick-up device 1 and female die 17.

In the rotary device according to the invention for a rivet setting machine for self-punching rivets, please note that the rotatable pick-up device 1 has an angle of rotation lock 2, wherein the angle of rotation lock 2 in the open state allows free rotation of the pick-up device holder 15 relative to a headpiece 12 while, in the closed state, stops the pick-up device 1 at a predeterminable angle. An important feature of the present invention is that the rotary device provides a simple member that is free to rotate or be stopped without the use of a separate or special tool.

To summarize, the present invention relates to a mechanism for rotating a pick-up device 1 about an axis of a headpiece 12 of a rivet setting machine and for releasably latching the pick-up device at predetermined rotational positions. The mechanism comprises a pick-up device holder 15 rotatable about the axis D of the headpiece and non-rotatably connected to the pick-up device. The pick-up device 1 has a plurality of circumferentially spaced cavities 5 on an outer surface thereof. A ball actuator 7 is supported for movement axially of the headpiece and non-rotatably with respect to the headpiece. The ball actuator has a bolt 6 with a guide 16 in which a ball 4 is mounted for movement into or out of an aligned cavity of the plurality of cavities in response to corresponding axial movement of the ball actuator 7 relative to the headpiece 12.

In a specific embodiment of the invention, there are a plurality of balls 4 and a plurality of bolts 6, each having a guide 16 in which a corresponding ball is mounted. The ball actuator 7 comprises a ring, and the bolts 6 are spaced circumferentially on the ring. The pick-up device holder 15 comprises a cylinder rotatably supported in the headpiece 12 and the ring 7 is supported on the headpiece surrounding the pick-up device holder. The ring 7 is movable along grooves on the headpiece, is spring biased in a direction away from the headpiece, and is movable in a direction toward the headpiece manually or automatically.

In general, the above identified embodiments are not to be construed as limiting the breadth of the present invention. It will be understood that modifications or other alternative constructions may become apparent within the scope of the invention as defined in the appended claims.

What is claimed is:

1. A mechanism for rotating a pick-up device about an axis of a headpiece of a rivet setting machine and for releasably latching the pick-up device at predetermined rotational positions, comprising:

a pick-up device holder rotatable about the axis of the headpiece and non-rotatably connected to the pick-up device, the pick-up device holder having a plurality of circumferentially spaced cavities on an outer surface thereof; and a ball actuator supported for movement axially of the headpiece and non-rotatably with respect to the headpiece, wherein the ball actuator has a bolt with a guide in which a ball is mounted for movement into or out of an aligned cavity of the plurality of cavities in response to corresponding axial movement of the ball actuator relative to the headpiece.

2. A mechanism according to claim 1, wherein there are a plurality of balls and a plurality of bolts, each having a guide in which a corresponding ball is mounted.

3. A mechanism according to claim 2, wherein the ball actuator comprises a ring and the bolts are spaced circumferentially on the ring.

4. A mechanism according to claim 3, wherein the pick-up device holder comprises a cylinder rotatably supported in the headpiece and the ring is supported on the headpiece surrounding the pick-up device holder.

5. A mechanism according to claim 4, wherein the ring is movable along grooves on the headpiece.

6. A mechanism according to claim 5, wherein the ring is spring biased in a direction away from the headpiece and is movable in a direction toward the headpiece manually or automatically.

7. A mechanism according to claim 1, wherein the headpiece is part of a C-bracket.

* * * * *